(12) United States Patent
Nanda et al.

(10) Patent No.: US 7,519,371 B2
(45) Date of Patent: Apr. 14, 2009

(54) MULTI-HOP COMMUNICATIONS IN A WIRELESS NETWORK

(75) Inventors: Sanjiv Nanda, Ramona, CA (US); Ranganathan Krishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 313 days.

(21) Appl. No.: 10/775,971

(22) Filed: Feb. 9, 2004

(65) Prior Publication Data

US 2005/0176401 A1 Aug. 11, 2005

(51) Int. Cl.
*H04Q 7/20* (2006.01)

(52) U.S. Cl. ............ 455/452.2; 455/452.1; 455/522; 455/41.2; 455/500; 455/502; 455/507; 455/509; 455/513; 370/235; 370/236; 370/252; 370/318; 370/400

(58) Field of Classification Search ............ 455/41.2–3, 455/445–451, 452.1–2, 453, 522, 90.1–2, 455/115.1–3, 226.1–4, 67.11–16, 63.1, 500–513; 370/229–230, 235–236, 252–253, 254–256, 370/318, 400–401
See application file for complete search history.

(56) References Cited

U.S. PATENT DOCUMENTS

| | | |
|---|---|---|
| 4,754,482 A | 6/1988 | Weiss |
| 4,850,019 A | 7/1989 | Shimizu et al. |
| 4,969,190 A | 11/1990 | Takaragi et al. |
| 5,077,793 A | 12/1991 | Falk et al. |
| 5,511,123 A | 4/1996 | Adams |

(Continued)

FOREIGN PATENT DOCUMENTS

KR  20020059296  7/2002

(Continued)

OTHER PUBLICATIONS

Sun et al., "Interference-aware MAC scheduling and SAR policies for bluetooth scatternets", Globecom '02, 2002—IEEE Global Telecommunications Conference, Conference Proceedings, Taipei, Taiwan, Nov. 17-21, 2002, IEEE Global Telecommunications Conference, New York, NY, IEEE, US, vol. 1 of 3, Nov. 17, 2002, pp. 11-15.

(Continued)

*Primary Examiner*—Tuan A Tran
(74) *Attorney, Agent, or Firm*—Albert J. Harnois, Jr.; Alan C. Gordon; Katherine Umpleby

(57) ABSTRACT

Systems and techniques are disclosed relating to wireless communications. The systems and techniques involve wireless communications wherein a module or communications device is configured to select first and second terminal pairs, the first terminal pair having a first transmitting terminal and a first receiving terminal, and the second terminal pair having a second transmitting terminal and a second receiving terminal, schedule a first signal transmission from the first transmitting terminal to an intermediate terminal, the first signal transmission being destined for the first receiving terminal, schedule, simultaneously with the first signal transmission, a second signal transmission from the second transmitting terminal to the second receiving terminal, and schedule a power level for each of the first and second signal transmissions that satisfies a target quality parameter for each of the intermediate terminal and the second receiving terminal.

29 Claims, 7 Drawing Sheets

U.S. PATENT DOCUMENTS

| | | | |
|---|---|---|---|
| 5,920,817 A | | 7/1999 | Umeda et al. |
| 6,044,062 A | | 3/2000 | Brownrigg et al. |
| 6,072,990 A | | 6/2000 | Agrawal et al. |
| 6,154,659 A | | 11/2000 | Jalali et al. |
| 6,442,152 B1 | | 8/2002 | Park et al. |
| 6,483,808 B1 | * | 11/2002 | Rochberger et al. .......... 370/238 |
| 6,831,904 B1 | | 12/2004 | Yamao et al. |
| 6,834,192 B1 | | 12/2004 | Watanabe et al. |
| 7,184,767 B2 | | 2/2007 | Gandolfo |
| 2002/0115409 A1 | | 8/2002 | Khayrallah |
| 2002/0191573 A1 | * | 12/2002 | Whitehill et al. ............. 370/338 |
| 2003/0031208 A1 | | 2/2003 | Anehem Magnus et al. |
| 2003/0083015 A1 | | 5/2003 | Palin et al. |
| 2003/0125066 A1 | | 7/2003 | Habetha |
| 2003/0161268 A1 | * | 8/2003 | Larsson et al. ............... 370/229 |
| 2003/0189906 A1 | * | 10/2003 | Belcea ........................ 370/318 |
| 2004/0009784 A1 | | 1/2004 | Ohkubo et al. |
| 2004/0157557 A1 | * | 8/2004 | Barnett et al. ............... 455/41.2 |
| 2004/0260808 A1 | * | 12/2004 | Strutt ........................... 709/224 |
| 2006/0046658 A1 | | 3/2006 | Cruz et al. |
| 2006/0183423 A1 | | 8/2006 | Johansson et al. |
| 2006/0280143 A1 | | 12/2006 | Dabak et al. |
| 2007/0117582 A1 | | 5/2007 | Ohkubo et al. |
| 2007/0183346 A1 | | 8/2007 | Thubert et al. |

FOREIGN PATENT DOCUMENTS

| | | |
|---|---|---|
| RU | 2207724 | 6/2003 |
| WO | 0141348 A | 6/2001 |
| WO | 0197448 A | 12/2001 |
| WO | 03009099 | 1/2003 |
| WO | 03009326 | 1/2003 |
| WO | 03407176 A | 6/2003 |
| WO | 04001521 | 12/2003 |
| WO | 04023668 A | 3/2004 |

OTHER PUBLICATIONS

Santhanam, Arvind V et al: "Optimal Routing, Link Scheduling And Power Control In Multi-Hop Wireless Networks" XP002329752 Database Accession No. E2003367620451 Abstract & Proc IEEE Infocom; Proceedings—IEEE Infocom 2003, vol. 1, 2003, pp. 702-711.

Cruz, R et al: "Optimal Link Scheduling and Power Control in CDMA Multihop Wireless Networks" Globecom' 02. 2002- IEEE Global Telecommunications Conference. Conference Proceedings. Taipei, Taiwan, Nov. 17-21, 2002, IEEE Global Telecommunications Conference, New York, NY: IEEE, US, vol. 1 of 3, Nov. 17, 2002, pp. 52-56, XP010635912 ISBN: 0-7803-7632-3.

International Search Report, PCT/US2005/008758, ISA-EP, Aug. 9, 2005.

International Search Report, PCT/US05/004457, ISA-EP, Jun. 9, 2005.

Written Opinion - PCT/US05/004487 - International Search Authority, European Patent Office - Jun. 9, 2005.

International Preliminary Report on Patentability - PCT/US05/004487 - IPEA, US - Jul. 17, 2006.

* cited by examiner

MULTI-HOP COMMUNICATIONS IN A WIRELESS NETWORK

FIELD

The present disclosure relates generally to wireless communications, and more specifically, to various systems and techniques to schedule direct and multi-hop communications within a network.

BACKGROUND

In conventional wireless communications, an access network is generally employed to support communications for a number of mobile devices. An access network is typically implemented with multiple fixed site base stations dispersed throughout a geographic region. The geographic region is generally subdivided into smaller regions known as cells. Each base station may be configured to serve all mobile devices in its respective cell. An access network may not be easily reconfigured when there are varying traffic demands across different cellular regions.

In contrast to the conventional access network, ad-hoc networks are dynamic. An ad-hoc network may be formed when a number of wireless communication devices, often referred to as terminals join together to form a network. Terminals in ad-hoc networks can operate as either a host or router. Thus, an ad-hoc network may be easily reconfigured to meet existing traffic demands in a more efficient fashion. Moreover, ad-hoc networks do not require the infrastructure required by conventional access networks, making ad-hoc networks an attractive choice for the future.

Ultra-Wideband (UWB) is an example of a communications technology that may be implemented with ad-hoc networks. UWB provides high speed communications over a wide bandwidth. At the same time, UWB signals are transmitted in very short pulses that consume very little power. The output power of the UWB signal is so low that it looks like noise to other RF technologies, making it less interfering.

Numerous multiple access techniques exist to support simultaneous communications in an ad-hoc network. A Frequency Division Multiple Access (FDMA) scheme, by way of example, is a very common technique. FDMA typically involves allocating distinct portions of the total bandwidth to individual communications between two terminals in the ad-hoc network. While this scheme may be effective for uninterrupted communications, better utilization of the total bandwidth may be achieved when such constant, uninterrupted communication is not required.

Other multiple access schemes include Time Division Multiple Access (TDMA). These TDMA schemes may be particularly effective in allocating limited bandwidth among a number of terminals which do not require uninterrupted communications. TDMA schemes typically dedicate the entire bandwidth to each communication channel between two terminals at designated time intervals.

Code Division Multiple Access (CDMA) techniques may be used in conjunction with TDMA to support multiple communications during each time interval. This may be achieved by transmitting each communication or signal in a designated time interval with a different code that modulates a carrier, and thereby, spreads the spectrum of the signal. The transmitted signals may be separated in the receiver terminal by a demodulator that uses a corresponding code to de-spread the desired signal. The undesired signals, whose codes do not match, are not de-spread in bandwidth and contribute only to noise.

In a TDMA system that uses spread-spectrum communications to support simultaneous transmissions, a robust and efficient scheduling algorithm is desired. The scheduling algorithm may be used to schedule direct and multi-hop communications, as well as the data rate and power level of those communications, to prevent excessive mutual interference.

SUMMARY

In one aspect of the present invention, a method of scheduling communications includes selecting first and second terminal pairs, the first terminal pair having a first transmitting terminal and a first receiving terminal, and the second terminal pair having a second transmitting terminal and a second receiving terminal, scheduling a first signal transmission from the first transmitting terminal to an intermediate terminal, the first signal transmission being destined for the first receiving terminal, scheduling, simultaneously with the first signal transmission, a second signal transmission from the second transmitting terminal to the second receiving terminal, and scheduling a power level for each of the first and second signal transmissions that satisfies a target quality parameter for each of the intermediate terminal and the second receiving terminal.

In another aspect of the present invention, a communications terminal includes a scheduler configured to select first and second terminal pairs, the first terminal pair having a first transmitting terminal and a first receiving terminal, and the second terminal pair having a second transmitting terminal and a second receiving terminal, the scheduler being further configured to schedule a first signal transmission from the first transmitting terminal to an intermediate terminal, the first signal transmission being destined for the first receiving terminal, schedule, simultaneously with the first signal transmission, a second signal transmission from the second transmitting terminal to the second receiving terminal, and schedule a power level for each of the first and second signal transmissions that satisfies a target quality parameter for each of the intermediate terminal and the second receiving terminal.

In yet another aspect of the present invention, a communications terminal includes means for selecting first and second terminal pairs, the first terminal pair having a first transmitting terminal and a first receiving terminal, and the second terminal pair having a second transmitting terminal and a second receiving terminal, means for scheduling a first signal transmission from the first transmitting terminal to an intermediate terminal, the first signal transmission being destined for the first receiving terminal, means for scheduling, simultaneously with the first signal transmission, a second signal transmission from the second transmitting terminal to the second receiving terminal, and means for scheduling a power level for each of the first and second signal transmissions that satisfies a target quality parameter for each of the intermediate terminal and the second receiving terminal.

In a further aspect of the present invention, computer readable media embodying a program of instructions executable by a computer program is capable of performing a method of scheduling communications, the method including selecting first and second terminal pairs, the first terminal pair having a first transmitting terminal and a first receiving terminal, and the second terminal pair having a second transmitting terminal and a second receiving terminal, scheduling a first signal transmission from the first transmitting terminal to an intermediate terminal, the first signal transmission being destined for the first receiving terminal, scheduling, simultaneously with the first signal transmission, a second signal transmission from the second transmitting terminal to the second receiving terminal, and scheduling a power level for each of the first and second signal transmissions that satisfies a target quality parameter for each of the intermediate terminal and the second receiving terminal.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

In the following detailed description, various aspects of the present invention may be described in the context of a UWB wireless communications system. While these inventive aspects may be well suited for use with this application, those skilled in the art will readily appreciate that these inventive aspects are likewise applicable for use in various other communication environments. Accordingly, any reference to a UWB communications system is intended only to illustrate the inventive aspects, with the understanding that such inventive aspects have a wide range of applications.

Figure 1:
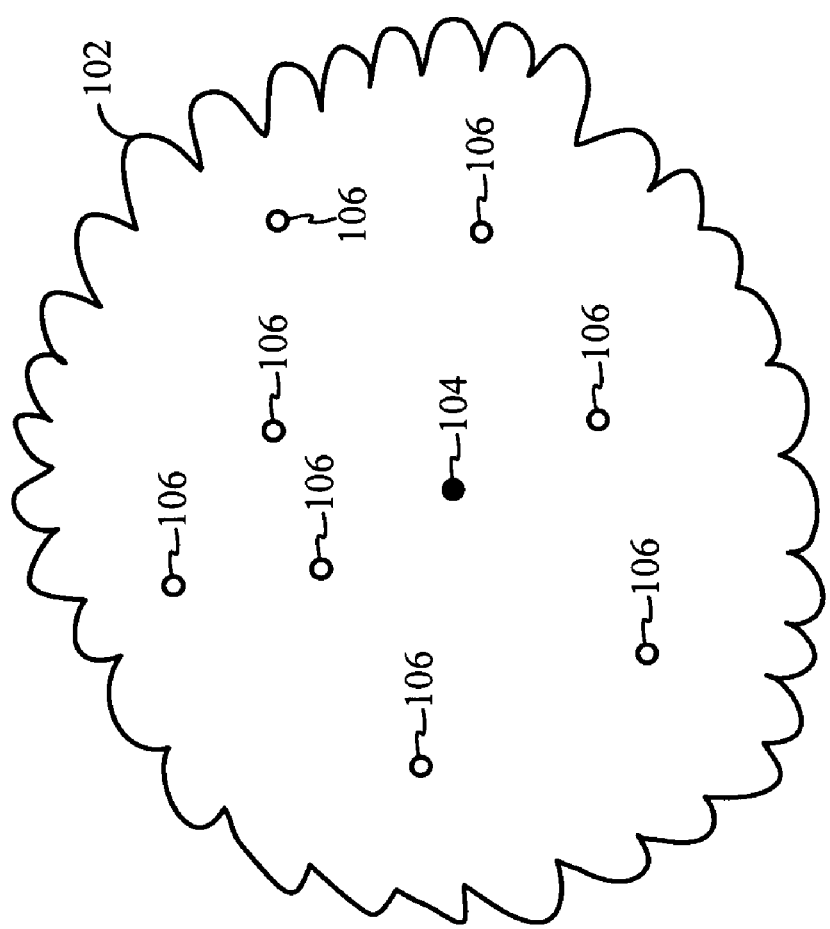
FIG. 1 is a conceptual diagram illustrating an example of a piconet.

FIG. 1 illustrates an example of a network topology for a piconet in a wireless communications system. A "piconet" is a collection of communication devices or terminals connected using wireless technology in an ad-hoc fashion. The terminals may be stationary or in motion, such as a terminal that is being carried by a user on foot or in a vehicle, aircraft or ship. The term "terminal" is intended to encompass any type of communications device including cellular, wireless or landline phones, personal data assistants (PDA), laptops, external or internal modems, PC cards, or any other similar devices.

In at least one embodiment of the wireless communications system, each piconet has one master terminal and any number of member terminals slaved to the master terminal. In FIG. 1, a piconet 102 is shown with a master terminal 104 supporting communications between several member terminals 106. The master terminal 104 may be able to communicate with each of the member terminals 106 in the piconet. The member terminals 106 may also be able to directly communicate with one another under control of the master terminal 104.

The master terminal 104 may communicate with the member terminals 106 using any multiple access scheme, such as TDMA, FDMA, CDMA, or any other multiple access scheme. To illustrate the various aspects of the present invention, the wireless communications system shown in FIG. 1 will be described in the context of a hybrid multiple access scheme employing both TDMA and CDMA technologies. Those skilled in the art will readily understand that the present invention is in no way limited to such multiple access schemes.

A piconet may be formed in a variety of ways. By way of example, when a terminal initially powers up, it may search for pilot signals from various piconet master terminals. The pilot signal broadcast by each piconet master terminal may be an unmodulated spread-spectrum signal, or any other reference signal. In spread-spectrum configurations, a psuedo-random noise (PN) code unique to each piconet master terminal may be used to spread the pilot signal. Using a correlation process, the terminal may search through all possible PN codes to identify the master terminal with the strongest pilot signal. If the strongest pilot signal is received with sufficient signal strength to support a minimum data rate, then the terminal may attempt to join the piconet by registering with the master terminal.

In some instances, a terminal may be unable to find a pilot signal of sufficient signal strength to support the minimum data rate. This may result from any number of reasons. By way of example, the terminal may be too far from the master terminal. Alternatively, the propagation environment may be insufficient to support the requisite data rate. In either case, the terminal may be unable to join an existing piconet, and therefore, may begin operating as an isolated terminal by transmitting its own pilot signal. The isolated terminal may become the master terminal for a new piconet. Other terminals that are able to receive the pilot signal broadcast from the isolated terminal with sufficient strength may attempt to acquire that pilot signal and join the piconet of this isolated terminal.

The master terminal 104 may use a periodic frame structure to coordinate intra-piconet communications. This frame is often referred to in the art as a Medium Access Control (MAC) frame because it is used to provide access to the communications medium for various terminals. The frame may be any duration depending on the particular application and overall design constraints. For the purpose of discussion, a frame duration of 5 ms will be used. A 5 ms frame is reasonable to accommodate a high chip rate of 650 Mcps and a desire to support data rates down to 19.2 kbps.

Figure 2:
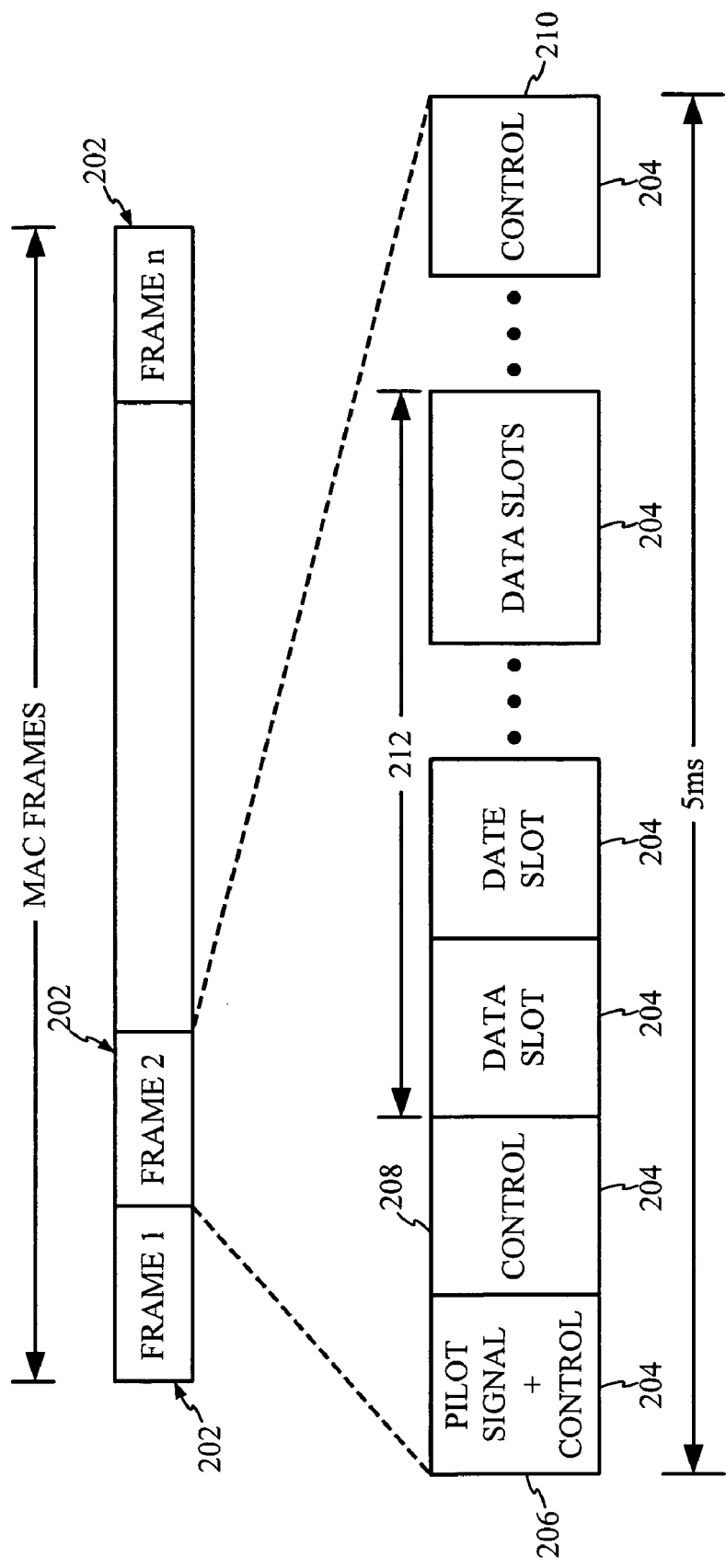
FIG. 2 is a conceptual diagram illustrating an example of a Medium Access Control (MAC) frame for controlling intra-piconet communications.

An example of a MAC frame structure is shown in FIG. 2 with n number of frames 202. Each frame may be divided into 160 or any other number of time slots 204. The slot duration may be 31.25 μs, which corresponds to 20,312.5 chips at 650 Mcps. The frame may dedicate some of its slots for overhead. By way of example, the first slot 206 in the frame 202 may be used to broadcast the spread-spectrum pilot signal to all the member terminals. The pilot signal may occupy the entire slot 206, or alternatively, be time shared with a control channel as shown in FIG. 2. The control channel occupying the end of the first slot 206 may be a spread-spectrum signal broadcast to all the member terminals at the same power level as the pilot signal. The master terminal may use this control channel to define the composition of the MAC frame.

The master terminal may be responsible for scheduling intra-piconet communications. This may be accomplished through the use of one or more additional spread-spectrum control channels which occupy various time slots within the frame, such as time slots 208 and 210 in FIG. 2. These additional control channels may be broadcast by the master terminal to all the member terminals and include various scheduling information. The scheduling information may include time slot assignments for communications between terminals within the piconet. As shown in FIG. 2, these time slots may be selected from the data slots portion 212 of the frame 202. Additional information, such as the power level and data rate for each communication between terminals, may also be included. The master terminal may also grant transmit opportunities in any given time slot to any number of terminal pairs using a CDMA scheme. In this case, the scheduling information may also assign the spreading codes to be used for the individual communications between terminals.

The master terminal may periodically set aside a fraction of time for peer-to-peer transmissions. During this time, the master terminal 104 may assign one of the member terminals 106 to communicate with one or more isolated terminals and/or adjacent piconets. These transmissions may require high transmit power, and in some instances, can only be sustained at low data rates. In the event that high power transmissions are needed to communicate with the isolated terminals and/or adjacent piconets, the master terminal may decide not to schedule any intra-piconet communications at the same time.

Figure 3:
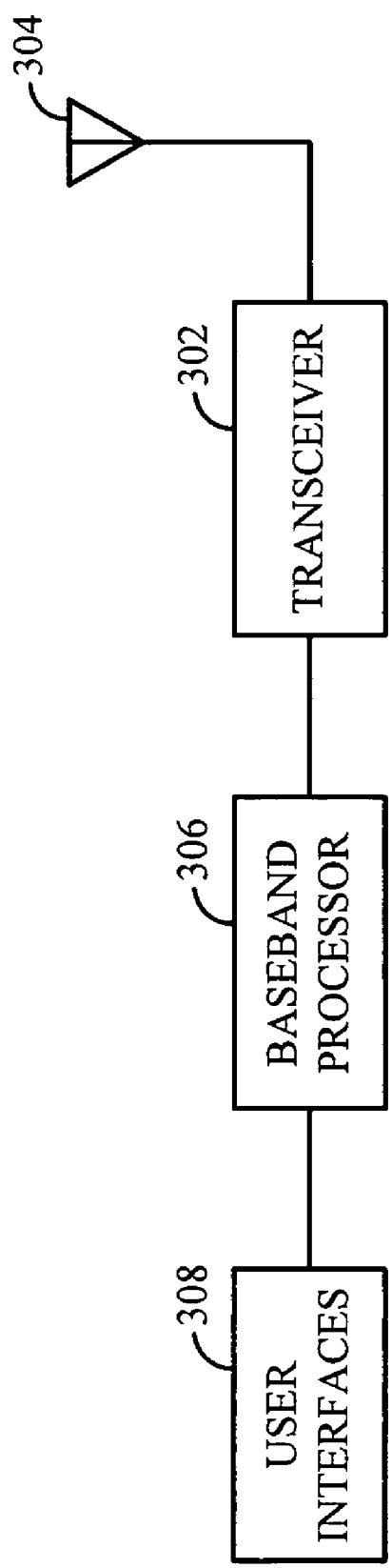
FIG. 3 is a functional block diagram illustrating an example of a terminal capable of operating within a piconet.

FIG. 3 is a conceptual block diagram illustrating one possible configuration of a terminal. As those skilled in the art will appreciate, the precise configuration of the terminal may vary depending on the specific application and the overall design constraints. For the purposes of clarity and completeness, the various inventive concepts will be described in the context of a UWB terminal with spread-spectrum capability, however, such inventive concepts are likewise suitable for use in various other communication devices. Accordingly any reference to a spread-spectrum UWB terminal is intended only to illustrate the various aspects of the invention, with the understanding that such aspects have a wide range of applications.

The terminal may be implemented with a front end transceiver 302 coupled to an antenna 304. A baseband processor 306 may be coupled to the transceiver 302. The baseband processor 306 may be implemented with a software based architecture, or any other type of architecture. A microprocessor may be used as a platform to run software programs that, among other things, provide executive control and overall system management functions that allow the terminal to operate either as a master or member terminal in a piconet. A digital signal processor (DSP) may be implemented with an embedded communications software layer which runs application specific algorithms to reduce the processing demands on the microprocessor. The DSP may be used to provide various signal processing functions such as pilot signal acquisition, time synchronization, frequency tracking, spread-spectrum processing, modulation and demodulation functions, and forward error correction.

The terminal may also include various user interfaces 308 coupled to the baseband processor 306. The user interfaces may include a keypad, mouse, touch screen, display, ringer, vibrator, audio speaker, microphone, camera and/or the like.

Figure 4:
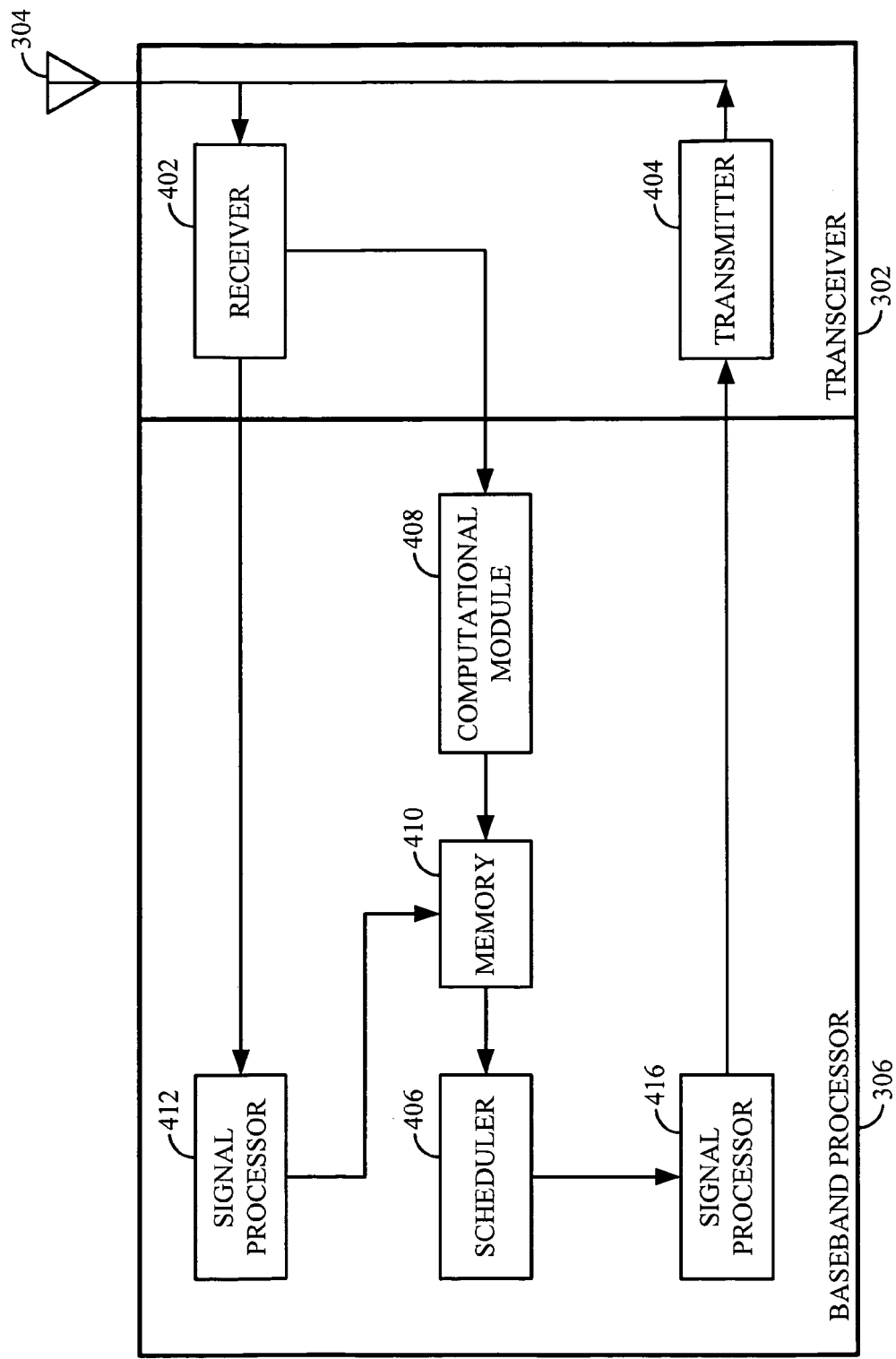
FIG. 4 is a functional block diagram illustrating an example of a baseband processor operating as a master terminal of the piconet.

FIG. 4 is a conceptual block diagram illustrating an example of a baseband processor operating as a master terminal. The baseband processor 306 is shown with the transceiver 302. The transceiver 302 may include a receiver 402. The receiver 402 provides detection of desired signals in the presence of noise and interference. The receiver 402 may be used to extract the desired signals and amplify them to a level where information contained in the received signal can be processed by the baseband processor 306.

The transceiver 302 may also include a transmitter 404. The transmitter 404 may be used to modulate information from the baseband processor 306 onto a carrier frequency. The modulated carrier may be upconverted to an RF frequency and amplified to a sufficient power level for radiation into free space through the antenna 304.

The baseband processor 306 may enable a scheduler 406 when operating as a master terminal. In the software based implementation of the baseband processor 306, the scheduler 406 may be a software program running on the microprocessor. However, as those skilled in the art will readily appreciate, the scheduler 406 is not limited to this embodiment, and may be implemented by any means known in the art, including any hardware configuration, software configuration, or combination thereof, which is capable of performing the various functions described herein.

The scheduler 406 may be used to schedule intra-piconet communications in a way that optimizes the capacity of the piconet. This may be achieved in a variety of ways. By way of example, the scheduler 406 may be used to carefully select the terminal pairs that will engage in simultaneous communications. Each communication may be performed by a direct communication between the terminal pairs, or alternatively, the communication may be routed through one or more intermediate terminals in the piconet. A communication routed through one or more intermediate terminals shall be referred to as a "multi-hop" communication. Each of the simultaneous communications may be scheduled at a transmission power level that satisfies a target quality parameter for each of the receiving terminals. The target quality parameter may be the carrier-to-interference (C/I) ratio at the receiving terminal, or any other quality parameter known in the art.

Figure 5:
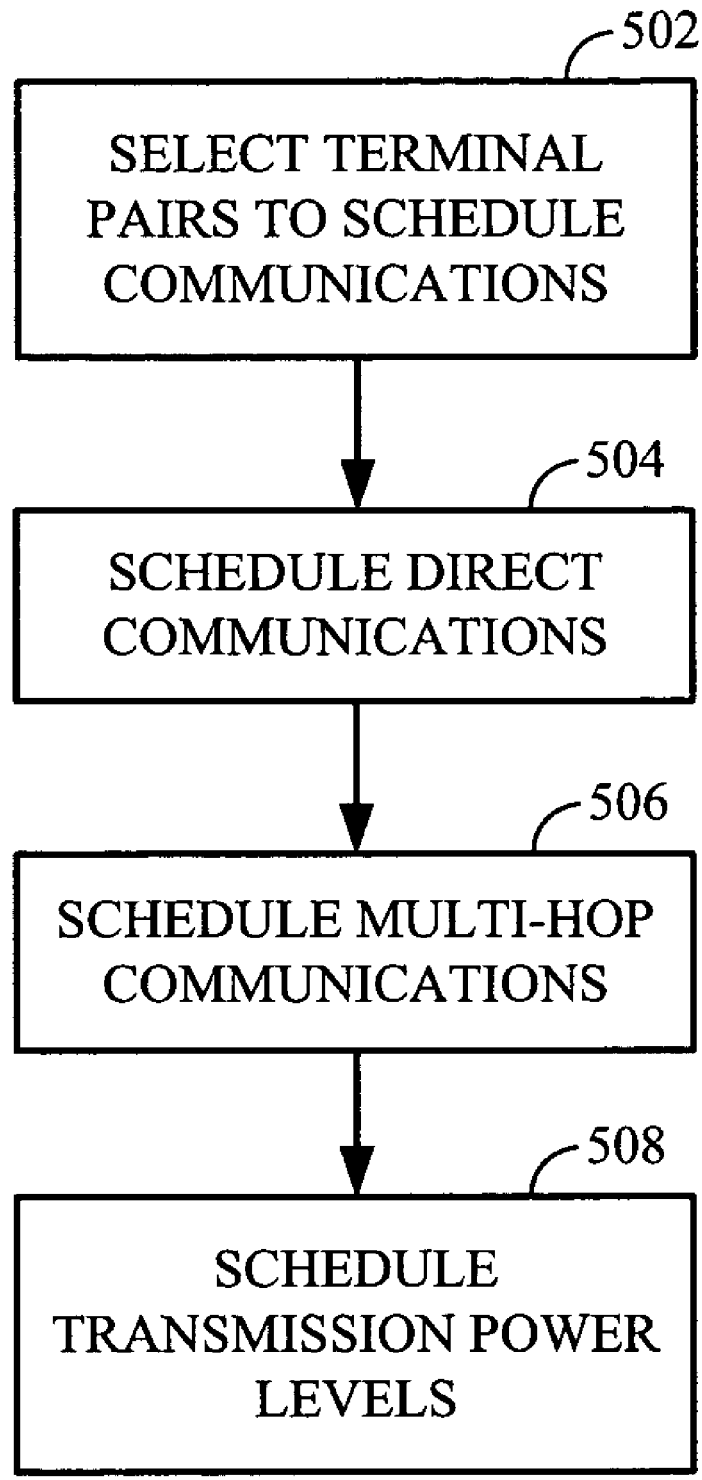
FIG. 5 is a flow diagram illustrating an example of the operation of a scheduler in a baseband processor.

FIG. 5 is a flow diagram illustrating an example of the operation of the scheduler. In step 502, the scheduler may be used to select the terminal pairs that will engage in communications during the next MAC frame. Initially, the scheduler may determine the amount of data remaining to be transmitted between each terminal pair currently engaged in communications following the current MAC frame. The scheduler may also schedule new calls between terminal pairs for the next MAC frame. In most instances, the total amount of data to be transmitted to support the existing calls, as well as the new calls, will far exceed that which can be transmitted in a single MAC frame. In that case, the scheduler may schedule only a fraction of the data for transmission in the next MAC frame. The amount of data that can be transmitted in the next MAC frame will depend on the various data rates that can be supported in conjunction with the quality of the wireless medium. Higher data rates tend to increase the amount of data that may be time-division mulitplexed into the MAC frame. However, higher data rates also tend to require a higher carrier-to-interface (C/I) ratio to meet the minimum QoS requirements, and therefore, limit the number of parallel transmissions that can be made. The scheduler may be configured in a way that draws a balance between these two competing factors to maximize the overall capacity of the piconet.

The scheduler may be used to determine the data rate for each new call. The data rate selected by the scheduler may be based on the type of service requested. By way of example, if a member terminal initiates a call with another member terminal to support a video application, the scheduler may determine that the call requires a high data rate. If another member terminal initiates a voice call to another member terminal, the scheduler may select a lower data rate to support the call. The data rates for existing calls are known, and therefore, do not need to be recalculated.

Scheduling decisions may be made once the data rate for each intra-piconet communication is determined. These scheduling decisions may be based on any number of considerations in accordance with any known scheduling algorithm. By way of example, scheduling decisions may be made based on a priority system, where voice communications are given priority over low latency communications. The scheduling algorithm may also give priority to high data rate transmissions in an effort to maximize throughput. A fairness criteria that considers the amount of data to be transferred between terminal pairs and the delay already experienced by such terminal pairs may also be considered. Other factors may be considered and are within the scope of the present invention. Those skilled in the art will be readily able to adapt existing scheduling algorithms to any particular piconet application.

The scheduler may increase the amount of data that can be transmitted in the next MAC frame by scheduling parallel transmissions. The parallel transmissions should be scheduled to maximize data throughput without causing excessive interference. This may be achieved by using a priority based algorithm to schedule parallel transmissions in multiple time slots while maintaining a target C/I ratio for each receiving terminal. The target C/I ratio is the C/I ratio needed to support the data rate that satisfies the desired QoS. The target C/I ratio for each receiving terminal for a new call may be computed from the maximum frame error rate (FER) by means well known in the art. The target C/I ratios for existing calls are known, and therefore, do not need to be recalculated.

Figure 6:
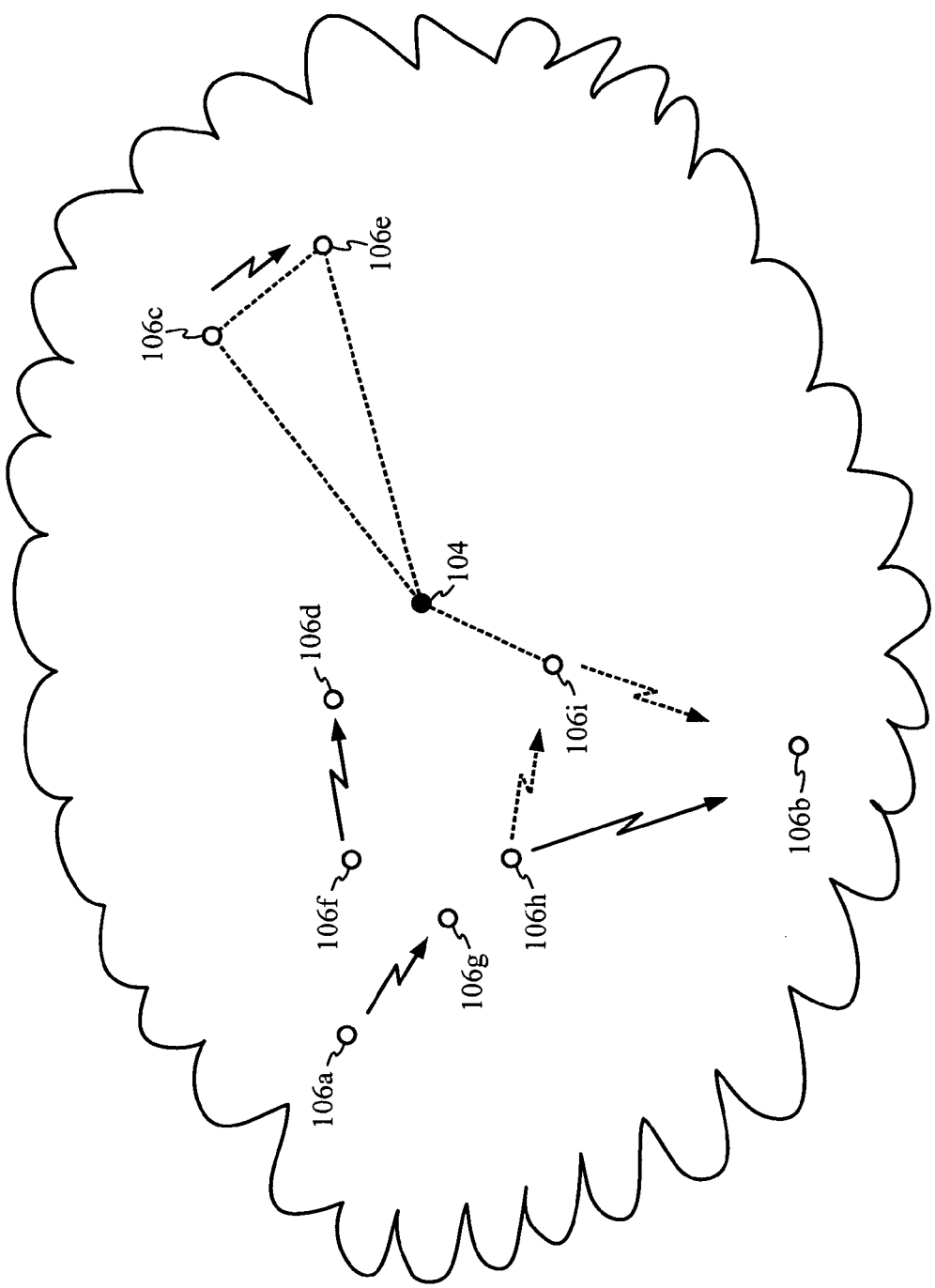
FIG. 6 is a conceptual block diagram illustrating an example of a piconet topology map.

The scheduler may be used to schedule simultaneous communications in a way that satisfies the target C/I ratio at each of the receiving terminals for a given MAC frame. A piconet topology map may be used for this purpose. An example of a piconet topology map is shown in FIG. 6. The piconet topology map may be constructed by the master terminal from transmissions its receives from the member terminals. Returning to FIG. 4, a computational module 408 may be used to measure the received signal strength of the member terminals. Since the timing and power level of each member terminal transmission is determined by the scheduler 406, this information may be provided to the computational module 408, and together with the measured received signal strength, the scheduler 406 may be able to compute the path loss to each member terminal.

The member terminals may also be used to periodically provide the master terminal with path loss measurements to other member terminals in the piconet. These measurements may be based on scheduled transmissions between the member terminals. The path loss measurements may be transmitted to the master terminal on one or more of the control channels. A signal processor 412 on the receiving end may employ spread-spectrum techniques to extract these measurements from the control channels and store them in memory 410.

Returning to FIG. 6, a series of broken lines between two terminals represents a known distance between two terminals. The distance on the map may be derived from the path loss measurements made at the master terminal, as well as those reported back to it by the member terminals. However, as will be explained in greater detail shortly, it is the measured path loss and not the distance that is used for parallel transmission scheduling decisions. Therefore, if the master terminal has path loss information for every possible combination of terminal pairs in the piconet, then parallel transmissions may be scheduled without having to know the angular coordinates of each member terminal with respect to the master terminal. As a practical matter, however, a piconet topology map with angular coordinates may prove quite useful in scheduling parallel transmissions.

A piconet topology map with angular coordinates may be constructed using any number of techniques including, by way of example, the Navstar Global Positioning (GPS) satellite navigation system. In this embodiment, each terminal may be equipped with a GPS receiver which is able to compute its coordinates by means well known in the art. The coordinates for the member terminals may be transmitted to the master terminal over the appropriate spread-spectrum control channel. Returning to FIG. 4, the signal processor 412 in the master terminal may employ spread-spectrum processing to extract the member terminal coordinates and provide them to the scheduler 406. The scheduler 406 may use these coordinates, together with its own coordinates, to construct a piconet topology map such as the one shown in FIG. 6.

The scheduler 406 may use the piconet topology map to estimate the path loss between terminal pairs for which path loss information is not otherwise available. The path loss is a function of the distance between the terminals and the environmental conditions. Since the path loss between a number of terminals is known, and the distance between the same terminals is also known, the effect of the environmental conditions on signal propagation can be estimated by the scheduler 406. If we assume that the environmental conditions are relatively the same throughout the piconet, the scheduler 406 may be able to compute the path loss between terminals for which no path loss information is otherwise available. The results of the path loss computations may be stored in memory 410 for later use. In short range applications, such as UWB, accurate path loss estimates may be made by assuming that the environmental conditions are substantially the same throughout the piconet.

Once the piconet topology map is constructed by the scheduler 406 and the path loss information stored in memory 410, the scheduling decisions may be made. The scheduler 406 may use the information contained in the piconet topology map in conjunction with any other appropriate factors bearing on the scheduling decisions to insure that the intra-piconet communications scheduled for the following MAC frame do not unduly interfere with one another.

Before describing a methodology for maintaining the target C/I ratio at each receiving terminal in a parallel transmission environment, it is illustrative to examine the impact of parallel transmissions in connection with FIG. 6. Assuming moderate target C/I requirements throughout the piconet, a transmission from the member terminal 106a to the member terminal 106g can probably be scheduled concurrently with a transmission from the member terminal 106c to the member terminal 106e. This scheduling decision should meet the target C/I requirements because the transmission from the member terminal 106a should not cause excessive interference at the member terminal 106e, and the transmission from the member terminal 106c should not cause excessive interference at the member terminal 106g.

A more aggressive scheduling decision might also include a transmission from the member terminal 106f to the member terminal 106d. If the target C/I requirement at the member terminal 106d is low enough, this scheduling decision may not result in excessive mutual interference. However, if the target C/I ratio at the member terminal 106d is high because of, for example, a high data rate application, then the signal power transmitted from the member terminal 106f may need to be sufficiently high, and as a result, cause excessive interference at the member terminal 106g. This interference may reduce the actual C/I ratio at the member terminal 106g below the target, thereby degrading performance to an unacceptable level. In this case, the transmission from the member terminal 106f to the member terminal 106d should be scheduled at a different time.

Another illustrative example will be discussed in connection with a pending transmission from the member terminal 106h to the member terminal 106b. When considering the piconet topology map, it would appear that this transmission should probably not be scheduled concurrently with the transmission from the member terminal 106a to the member terminal 106g even if the target C/I ratio at the member terminal 106b is extremely low. The transmission power at the member terminal 106f needed to overcome path loss to the member terminal 106b would probably unduly interfere with the reception at the member terminal 106g.

As an alternative approach to scheduling a transmission from the member terminal 106h to the member terminal 106b at a different time, the communication may be scheduled through one or more intermediate terminals in a multi-hop fashion. By way of example, the communication from the member terminal 106h to the member terminal 106b may be routed through the member terminal 106i. In this case, the transmission power at the member terminal 106h can be significantly reduced to accommodate the short distance transmission to the member terminal 106i. This reduction in transmission power at the member terminal 106h translates into an increase in C/I ratio at the member terminal 106g. Depending on the target C/I ratio at the member terminal 106g, the transmission from the member terminal 106h to the member terminal 106i may be scheduled concurrently with transmission from the member terminal 106a to the member terminal 106g.

The second leg of the transmission from the member terminal 106i to the member terminal 106b may also be scheduled concurrently with the transmission from the member terminal 106a to the member terminal 106g in the next MAC frame. Although the transmission power at the member terminal 106i may need to be increased over the second leg of the transmission to overcome the path loss resulting from the distance to the member terminal 106b, the distance between the member terminal 106i and the member terminal 106g may be sufficient to attenuate the resulting interference to a level that meets the target C/I ratio of the member terminal 106g.

Returning to FIG. 5, the scheduling algorithm may be used to schedule the direct communications, in step 504, and the multiple-hop communications, in step 506, for each MAC frame. This may be achieved in a variety of fashions depending on the specific application, designer preference and the overall design constraints. By way of example, the scheduling algorithm may use the information contained in the piconet topology map in an attempt to schedule communications that maximize throughput, while at the same time adhere to a certain degree of fairness among the piconet terminals.

Although the procedures for scheduling the direct and multi-hop communications are shown in FIG. 5 by sequentially scheduling the direct communications, and then scheduling the multi-hop communications, those skilled in the art will appreciate that the order may be reversed. Alternatively, the scheduling of direct and multi-hop communications may be done in parallel.

The scheduling algorithm may also be used to schedule the transmission power level for each communication, in step 508, in a way that maintains the target C/I ratio at each receiving terminal. By way of example, direct communications may be scheduled in each time slot if the target C/I ratio at each receiving terminal can be met. In the event that the target C/I ratio at each receiving terminal cannot be met in a given time slot for simultaneous direct communications between terminal pairs, then one or more of the communications may be scheduled in a multi-hop fashion. Alternatively, a decision may be made between a direct or multi-hop communication based on the communication path that requires the minimum sum of total power to complete the transmission between the terminal pairs. These multi-hop communications may be directed to various intermediate terminals and forwarded to their respective destination terminals in a subsequent time slot of the MAC frame. The scheduling of the direct and multi-hop communications for each time slot may involve an iterative process of transmission power computations to insure that the target C/I ratio is met for every receiving terminal. One example of this computation will be provided below for a single time slot in the MAC frame with three simultaneous transmissions.

Turning back to FIG. 6, the three simultaneous transmissions include a transmission from the member terminal 106a to the member terminal 106g, a transmission from the member terminal 106c to the member terminal 106e, and finally, a transmission from the member terminal 106f to the member terminal 106b. The C/I ratio ($C/I_G$) at the member terminal 106g can be computed by the scheduler at the master terminal as follows. The signal strength at the member terminal 106g is equal to the transmission power ($P_A$) at the member terminal 106a less the path loss ($L_{A-G}$) from the member terminal 106a to the member terminal 106g. The interference at the member terminal 106g results from the signal transmissions by the member terminals 106c and 106f, and can be represented by the transmission power ($P_C$) at the member terminal 106c less the path loss ($L_{C-G}$) from the member terminal 106c to the member terminal 106g plus the transmission power ($P_F$) at the member terminal 106f less the path loss ($L_{F-G}$) from the member terminal 106f to the member terminal 106g. Based on these relationships, the C/I ratio may be computed in the logarithmic domain by the following equation:

$$C/I_G \text{ dB} = P_A - L_{A-G} - (P_C - L_{C-G} + P_F - L_{F-G} + M) \tag{1}$$

where M is equal to an interference margin that may be used to account for out-of-piconet interference.

Two similar equations may also be used to compute the C/I ratios at the member terminal receivers 106e and 106b. The C/I ratio ($C/I_E$) at the member terminal 106e may be computed in the logarithmic domain by the following equation:

$$C/I_E \, dB = P_C - L_{C-E} - (P_A - L_{A-E} + P_F - L_{F-E} + M) \quad (2)$$

where:

$L_{C-E}$ is the path loss from the member terminal 106c to the member terminal 106e;

$L_{A-E}$ is the path loss from the member terminal 106a to the member terminal 106e; and $L_{F-E}$ is the path loss from the member terminal 106f to the member terminal 106e.

The C/I ratio ($C/I_B$) at the member terminal 106b may be computed in the logarithmic domain by the following equation:

$$C/I_B \, dB = P_F - L_{F-B} - (P_A - L_{A-B} + P_C - L_{C-B} + M) \quad (3)$$

where:

$L_{F-B}$ is the path loss from the member terminal 106f to the member terminal 106b;

$L_{A-B}$ is the path loss from the member terminal 106a to the member terminal 106b; and $L_{C-B}$ is the path loss from the member terminal 106c to the member terminal 106b.

Substituting into equations (1)-(3) the target C/I ratios for each of the receiving terminals and the path loss information stored in memory, we are left with three equations and three unknowns ($P_A$ $P_C$ $P_F$) which may be solved algebraically. Assuming that all three equations can be satisfied, then the simultaneous transmissions from the member terminals 106a, 106c and 106f may be scheduled at the computed power levels. If, on the other hand, no combination of power levels can satisfy all three equations, or if any of the required power levels exceed the maximum transmit power of the terminal, then the scheduling algorithm may reassign one or more of the transmissions to an intermediate terminal for a multi-hop communication.

Referring to FIG. 6, one can readily ascertain that it is unlikely that any combination of power levels can satisfy all three equations. If the transmission power ($P_F$) is too low, then the target C/I ratio may not be met at the receiving terminal 106b because the signal may be too weak due to the path loss ($L_{F-B}$). If the transmission power ($P_F$) at the transmitting terminal 106f is increased to meet the target C/I ratio at the receiving terminal 106b, then the transmission may interfere with the ability of the member terminal 106g to meet its target C/I ratio. As a result, the scheduling algorithm may decide to reschedule the transmission from the member terminal 106f to the member terminal 106b through an intermediate terminal, such as the member terminal 106d.

In another embodiment of the scheduling algorithm, a decision may be made to schedule every communication between two terminals which are spaced apart by at least a threshold distance in a multi-hop fashion. This decision may be made prior to performing a power level computation. In this case, the scheduling algorithm may determine that the transmission from the member terminal 106f to the member terminal 106b should be scheduled as a multi-hop communication before computing the power levels. A decision may be made to route the communication through the member terminal 106d, and then a computation performed to determine whether any combination of power levels can support simultaneous transmissions from the member terminals 106a, 106c and 106f while meeting the target C/I ratios for the member terminals 106g, 106e and 106d.

In yet another embodiment of the scheduling algorithm, the piconet topology map may be consulted before the power level computation is made. The advantage of this approach is that the communication between the member terminals 106f and 106b may not automatically warrant a multi-hop communication just because of the distance between the two. By way of example, if the scheduling algorithm determined that the transmission from the member terminal 106f to the member terminal 106b should occur concurrently with the transmission from the member terminal 106c to the member terminal 106e, then both transmissions may be supported as direct communications. It is only when a transmission from the member terminal 106a to the member terminal 106g is also scheduled at the same time, that the transmission power from the member terminal 106f becomes problematic. Thus, an algorithm could be readily devised by those skilled in the art to consider the distance between two terminals engaged in communications in relation to the terminals in close proximity to the transmitting terminals in making an initial scheduling decision with respect to multi-hop communications before computing power levels.

Once the scheduling decisions are made, they may be transmitted to the member terminals in the piconet over one or more control channels in the following MAC frame. Referring to FIG. 4, a signal processor 416 on the transmitting end may be used to spread the schedule assignments before being provided to the transceiver 302 for broadcast to the various member terminals.

Figure 7:
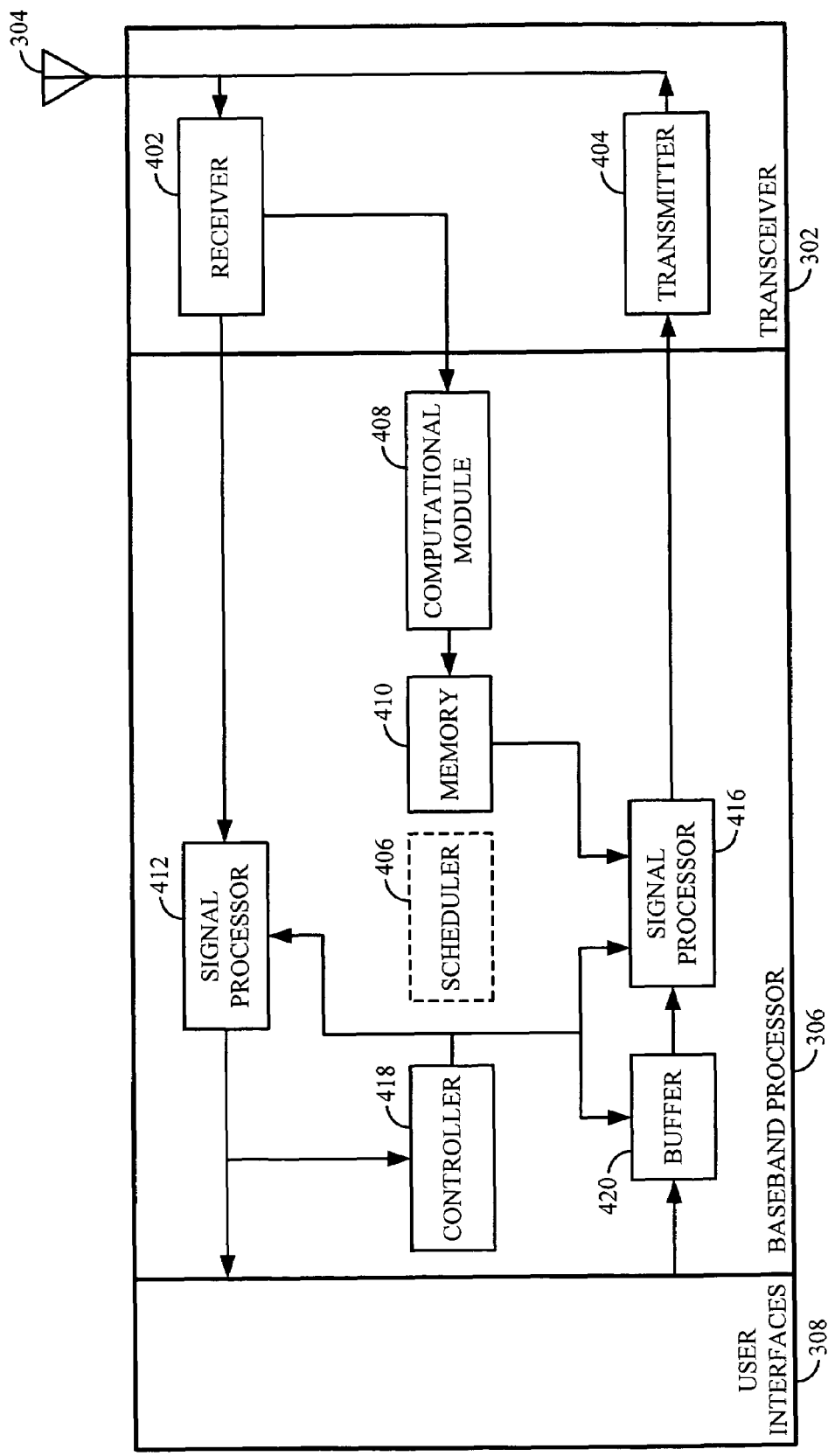
FIG. 7 is a functional block diagram illustrating an example of a baseband processor operating as a member terminal of the piconet.

FIG. 7 is a conceptual block diagram illustrating an example of a terminal with the baseband processor configured as a member terminal. The scheduler 406 is shown with phantom lines illustrating that it is not enabled by the baseband processor 306 during operation as a member terminal. The configuration of the transceiver 302 is the same whether the baseband processor 306 is operating as a master or member terminal, and therefore, will not be discussed further. The transceiver 302 is shown in FIG. 7 for the completeness.

As discussed earlier in connection with the baseband processor 306 configured as a master terminal, the scheduling assignments may be broadcast to all the member terminals in the piconet on one or more control channels. The signal processor 412 on the receiving end may employ spread-spectrum processing to extract the scheduling information from the control channel and provide it to a controller 418. The scheduling information may include the time slot assignments for the various transmissions to and from the member terminal, as well as the power level and data rate for each. The scheduling information may also include a message indicating whether the terminal is an intermediate terminal supporting a multi-hop communication. In that case, the time slots for receiving the communication from a member terminal and retransmitting the communication to another member terminal may also be identified with the corresponding power level and data rate.

The controller 418 may be used to provide data rate and spreading information to the signal processor 412 on the receiving end for the scheduled transmissions to the member terminal. Using this information, the signal processor 412 may recover communications from other member terminals at the appropriate times and provide the recovered communications to the various user interfaces 408. Communications intended for retransmission to support multi-hop communications may be stored in memory 410 until scheduled for retransmission.

The controller 418 may also provide power level information to the computational module 408 for each transmission from another terminal. The computational module 408 may use this information to compute the path loss from the transmitting terminal by using the signal strength measurement from the transceiver 302 during scheduled transmissions. The path loss information computed by the computational module 408 may be stored in memory 410 and provided to the signal processor 416 on the transmitting end during the scheduled time for the control channel broadcast. In various embodiments of the terminal employing a GPS receiver (not shown), it may be used to provide coordinate information to the master terminal over a control channel broadcast via the signal processor 416 and the transceiver 302.

The signal processor 416 may be used to spread communications to various member terminals within the piconet. The communications may be originated from the various user interfaces 308 and stored in a buffer 420 until the scheduled transmission. At the scheduled time, the controller 418 may be used to release the communications from the buffer 420 to the signal processor 416 for spread-spectrum processing. The signal processor 416 may also pull from memory 410 various communications for retransmission in a multi-hop fashion at the appropriate time. The data rate, spreading code and transmission power level of the communications may be programmed into the signal processor 416 by the controller 418. Alternatively, the transmission power level may be programmed by the controller 418 at the transmitter 404 in the transceiver 302.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the terminal, or elsewhere. In the alternative, the processor and the storage medium may reside as discrete components in the terminal, or elsewhere.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of scheduling communications, comprising:

selecting first and second terminal pairs, the first terminal pair having a first transmitting terminal and a first receiving terminal, and the second terminal pair having a second transmitting terminal and a second receiving terminal;

determining whether a first direct signal transmission from the first transmitting terminal to the first receiving terminal simultaneously with a second direct signal transmission from the second transmitting terminal to the second receiving terminal does not satisfy both a target quality parameter for the first receiving terminal and a target quality parameter for the second receiving terminal;

scheduling, based on the determining step, a first signal transmission from the first transmitting terminal to an intermediate terminal, the first signal transmission being destined for the first receiving terminal;

scheduling, simultaneously with the first signal transmission, a second signal transmission from the second transmitting terminal to the second receiving terminal; and scheduling a power level for each of the first and second signal transmission that satisfies a target quality parameter for the intermediate terminal and the target quality parameter of the second receiving terminal.

2. The method of claim 1, wherein the determination that the direct signal transmission from the first transmitting terminal to the first receiving terminal, simultaneously with the second signal transmission, does not satisfy the target quality parameters for each of the first and second receiving terminals comprises attempting to compute a power level for each of the direct signal transmission from the first transmitting terminal to the first receiving terminal and the second signal transmission that satisfies the target quality parameter for each of the first and second receiving terminals.

3. The method of claim 1 wherein the determination that the direct signal transmission between the first transmitting terminal and the first receiving terminal, simultaneously with the second signal transmission, does not satisfy the target quality parameters for each of the first and second receiving terminals is a function of the distance between the first transmitting terminal and the first receiving terminal and the distance between the first transmitting terminal and the second receiving terminal.

4. The method of claim 1 wherein the determination that the direct signal transmission between the first transmitting terminal and the first receiving terminal, simultaneously with the second signal transmission, does not satisfy the target quality parameters for each of the first and second receiving terminals is a function of the distance between the first transmitting terminal and the first receiving terminal and the distance between the first transmitting terminal and the second receiving terminal.

5. The method of claim 4 wherein the first and second terminal pairs are selected from a piconet of terminals.

6. The method of claim 5, further comprising constructing a piconet topology map, and wherein at least a portion of the path loss information is derived from the piconet topology map.

7. The method of claim 1 further comprising selecting a third terminal pair having a third transmitting terminal and a third receiving terminal, and scheduling a third signal transmission therebetween simultaneously with a retransmission of the first signal transmission from the intermediate terminal to the first receiving terminal.

8. The method of claim 7 further comprising scheduling a power level for each of the retransmission of the first signal transmission and the third signal transmission that satisfies a target quality parameter for each of the first and third receiving terminals.

9. The method of claim 1 further comprising scheduling a different spreading code for each of the first and second signal transmissions.

10. The method of claim 1 wherein the parameter comprises a carrier-to-interference ratio.

11. The method of claim 1 further comprising transmitting the first signal transmission from the first transmitting terminal to the intermediate terminal simultaneously with transmitting the second signal transmission from the second transmitting terminal to the second receiving terminal.

12. A communications terminal, comprising:
a scheduler configured to select first and second terminal pairs, the first terminal pair having a first transmitting terminal and a first receiving terminal, and the second terminal pair having a second transmitting terminal and a second receiving terminal, the scheduler being further configured to schedule a first signal transmission from the first transmitting terminal to an intermediate terminal, the first signal transmission being destined for the first receiving terminal, schedule, simultaneously with the first signal transmission, a second signal transmission from the second transmitting terminal to the second receiving terminal, and schedule a power level for each of the first and second signal transmissions that satisfies a target quality parameter for each of the intermediate terminal and the second receiving terminal, wherein the scheduler is farther configured to schedule the first signal transmission if a direct signal transmission from the first transmitting terminal to the first receiving terminal, simultaneously with the second signal transmission, does not satisfy both a target quality parameter for the first receiving terminal and the target quality parameter for the second receiving terminal.

13. The communications terminal of claim 12 wherein the scheduler is further configured to determine that the direct signal transmission from the first transmitting terminal to the first receiving terminal, simultaneously with the second signal transmission, does not satisfy the target quality parameters for each of the first and second receiving terminals by attempting to compute a power level for each of the direct signal transmission from the first transmitting terminal to the first receiving terminal and the second signal transmission that satisfies the target quality parameter for each of the first and second receiving terminals.

14. The communications terminal of claim 12 wherein the scheduler is further configured to determine that the direct signal transmission between the first transmitting terminal and the first receiving terminal, simultaneously with the second signal transmission, does not satisfy the target quality parameters for each of the first and second receiving terminals as a function of the distance between the first transmitting terminal and the first receiving terminal and the distance between the first transmitting terminal and the second receiving terminal.

15. The communications terminal of claim 12 wherein the scheduler is further configured to determine that the direct signal transmission from the first transmitting terminal to the first receiving terminal, simultaneously with the second signal transmission, does not satisfy the target quality parameters for each of the first and second receiving terminals as a function of path loss information between the first transmitting terminal and the first receiving terminal and path loss information between the first transmitting terminal and the second receiving terminal.

16. The communications terminal of claim 15 wherein the scheduler is further configured to select the first and second terminal pairs from a piconet of terminals.

17. The communications terminal of claim 16 wherein the scheduler is further configured to construct a piconet topology map, and derive at least a portion of the path loss information from the piconet topology map.

18. The communication termination of claim 12 wherein the scheduler is further configured to select a third terminal pair having a third transmitting terminal and a third receiving terminal, and schedule a third signal transmission therebetween simultaneously with a retransmission of the first signal transmission from the intermediate terminal to the first receiving terminal.

19. The communications terminal of claim 18 wherein the scheduler is further configured to schedule a power level for each of the retransmission of the first signal transmission and the third signal transmission that satisfies a target quality parameter for each of the first and third receiving terminals.

20. The communications terminal of claim 12 wherein the scheduler is further configured to schedule a different spreading code for each of the first and second signal transmissions.

21. The communications terminal of claim 12 wherein the parameter comprises a carrier-to-interference ratio.

22. The communications terminal of claim 12 further comprising a receiver configured to receive communications from a plurality of terminals and a transmitter configured to transmit communications to the plurality of terminals, the scheduler being communicatively coupled to the receiver and transmitter.

23. The communications terminal of claim 22 further comprising a receiving signal processor configured to despread communications between the receiver and the scheduler, and a transmitting signal processor configured to spread communications between the scheduler and the transmitter.

24. The communications terminal of claim 22 further comprising a plurality of user interfaces communicatively coupled to the receiver and transmitter.

25. The communications terminal of claim 24 further comprising a receiving signal processor configured to despread communications between the receiver and a first one of the user interfaces, and a transmitting signal processor configured to spread communications between a second one of the user interfaces and the transmitter.

26. A communications terminal, comprising:
means for selecting first and second terminal pairs, the first terminal pair having a first transmitting terminal and a first receiving terminal, and the second terminal pair having a second transmitting terminal and a second receiving terminal;
means for determining whether a first direct signal transmission from the first transmitting terminal to the first receiving terminal simultaneously with a second direct signal transmission from the second transmitting terminal to the second receiving terminal does not satisfy both a target quality parameter for the first receiving terminal and a target quality parameter for the second receiving terminal;
means for scheduling a first signal transmission from the first transmitting terminal to an intermediate terminal, the first signal transmission being destined for the first receiving terminal;

scheduling, simultaneously with the first signal transmission, a second signal transmission from the second transmitting terminal to the second receiving terminal; and scheduling a power level for each of the first and second signal transmission that satisfies a target quality parameter for the intermediate terminal and the target quality parameter of the second receiving terminal.

27. The communications terminal of claim 26 further comprising means for scheduling a different spreading code for each of the first and second signal transmissions.

28. Computer readable media embodying a program of instructions executable by a computer processor to perform a method of scheduling communications, the method comprising:

selecting first and second terminal pairs, the first terminal pair having a first transmitting terminal and a first receiving terminal, and the second terminal pair having a second transmitting terminal and a second receiving terminal;

determining whether a first direct signal transmission from the first transmitting terminal to the first receiving terminal simultaneously with a second direct signal transmission from the second transmitting terminal to the second receiving terminal does not satisfy both a target quality parameter for the first receiving terminal and a target quality parameter for the second receiving terminal;

scheduling, based on the determining step, a first signal transmission from the first transmitting terminal to an intermediate terminal, the first signal transmission being destined for the first receiving terminal, wherein the scheduling of the first signal transmission further comprises;

scheduling, simultaneously with the first signal transmission, a second signal transmission from the second transmitting terminal to the second receiving terminal; and scheduling a power level for each of the first and second signal transmission that satisfies a target quality parameter for the intermediate terminal and the target quality parameter of the second receiving terminal.

29. The computer readable media of claim 28 wherein the method further comprises scheduling a different spreading code for each of the first and second signal transmissions.

* * * * *